US007962518B2

(12) United States Patent
Park et al.

(10) Patent No.: US 7,962,518 B2
(45) Date of Patent: Jun. 14, 2011

(54) METHOD AND APPARATUS TO CONTROL MEDIA TRANSFER PROTOCOL DEVICE TO MANAGE MEDIA FILE

(75) Inventors: Young-min Park, Yongin-si (KR); Tae-kwon Noh, Uiwang-si (KR); Tae-hun Lee, Suwon-si (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 407 days.

(21) Appl. No.: 12/131,273

(22) Filed: Jun. 2, 2008

(65) Prior Publication Data

US 2009/0138492 A1    May 28, 2009

(30) Foreign Application Priority Data

Nov. 27, 2007    (KR) .................. 10-2007-0121394

(51) Int. Cl.
 *G06F 17/30* (2006.01)
(52) U.S. Cl. .................. 707/786; 707/705; 707/829
(58) Field of Classification Search .................. 707/705, 707/809, 786, 829
See application file for complete search history.

(56) References Cited

U.S. PATENT DOCUMENTS

2007/0294292 A1* 12/2007 Hydrie et al. .............. 707/104.1
2008/0052323 A1*  2/2008 Dodge et al. .................. 707/201
* cited by examiner

*Primary Examiner* — Cheryl Lewis
(74) *Attorney, Agent, or Firm* — Stanzione & Kim, LLP

(57) ABSTRACT

A method and apparatus controls an MTP device to manage a media file transmitted by an MTP host. According to the method, when the number of files in a folder assigned by the MTP host is equal to or more than a predetermined number while storing a media file received from the MTP host, the MTP device generates a new folder and stores the corresponding media file in the new folder. Accordingly, the files within the predetermined number can be stored in one file. Since the number of files stored in one folder is limited, delay in processing media files due to the large number of files can be reduced.

9 Claims, 5 Drawing Sheets

METHOD AND APPARATUS TO CONTROL MEDIA TRANSFER PROTOCOL DEVICE TO MANAGE MEDIA FILE

CROSS-REFERENCE TO RELATED APPLICATIONS

This application claims priority under 35 U.S.C. §119 from Korean Patent Application No. 10-2007-0121394, filed on Nov. 27, 2007, in the Korean Intellectual Property Office, the disclosure of which is incorporated herein in its entirety by reference.

BACKGROUND OF THE INVENTION

1. Field of the Invention

The present general inventive concept relates to a media transfer protocol (MTP), and more particularly, to a method and apparatus to control an MTP device to store a file received from an MTP host.

2. Description of the Related Art

A media transfer protocol (MTP) is a protocol developed by Microsoft to be used in a portable device, such as a digital camera or an MP3 player, including a hard disk drive.

In order to connect a conventional mass storage class (MSC) based portable device and a window media device manager (WMDM) application program interface (API), a user has to install a device driver. Also, a personal computer (PC) recognizes the portable device as a passive movable storage device, and so a user has to execute an explorer of Microsoft Windows so as to manage files stored in a hard disk of the portable device.

However, in an MTP device, a device driver is already included in a Windows Media Player. Accordingly, a file transmission or a synchronization between a portable device (MTP device) and a PC (MTP host) is possible in the Windows Media Player, and digital right management (DRM) can be effectively applied on media files.

FIG. 1 is a flowchart illustrating conventional processes of transmitting a file between an MTP device and an MTP host.

In operation 101, the MTP host requests the MTP device for information about object handles.

In operation 102, the MTP host receives the information about object handles from the MTP device.

A file allocation table (FAT) file system used by a MSC based portable device is recognized as another "drive" of a PC when connected to the PC. Accordingly, the file system of the portable device is directly managed by the PC, whereas a file system of the MTP device is not recognized by the MTP host.

However, even if the MTP host does not recognize the file system of the MTP device, objects, such as files and folders, stored in the file system of the MTP device can be specified by using an object handle obtained via communication between the MTP host and the MTP device. Accordingly, there is no problem in transmitting files between the MTP device and the MTP host. Here, the object handle denotes an identifier used to specify an object in the file system of the MTP device between the MTP device and the MTP host.

In operation 103, the MTP host analyzes metadata of a media file that is to be transmitted to the MTP device. For example, when the media file is an MP3 audio file, metadata may include an artist, an album, a genre of music, etc.

In operation 104, the MTP host transmits the media file and an object handle, which indicates a location where the media file is to be stored, to the MTP device. Generally, the object handle indicates a parent object of the media file.

In operation 105, the MTP device stores the media file in the location indicated by the object handle, and updates a database of media files.

In operation 106, the MTP device transmits information about updated object handles to the MTP host.

Accordingly, the MTP device and the MTP host build a directory hierarchy in the MTP device according to the metadata of the media file, and thus the user does not need to individually determine a folder to be stored while directly generating a folder in the file system of the MTP device or storing a media file in the MTP device.

FIG. 2 is a diagram illustrating a conventional directory hierarchy built in a file system of an MTP device having an MTP module and a file system.

As illustrated in FIG. 2, an MTP host commands the MTP device to generate folders, such as an <AUDIO> folder, an <ARTIST> folder, a <BEATLES> folder, a <video> folder, etc., according to metadata of a media file, and to store the media file in the <BEATLES> folder. Although not illustrated in FIG. 2, a media file of metadata without any of the above-described folders can be stored in an <UNKNOWN> folder.

As described above, according to the conventional technology, a music file of a certain artist is stored in the same folder of the MTP device, and specifically in the <UNKNOWN> folder.

Accordingly, when the MTP device is used for a long time, the number of media files stored in one folder increases, and thus the speed of reading and writing the media file decreases. Consequently, the speed of transmitting a file from the MPT host to the MTP device decreases, causing a user inconvenience. Such problem becomes more serious when the amount of content provided by a content provider increases and the storage capacity of a portable device increases.

SUMMARY OF THE INVENTION

The present general inventive concept provides a method and apparatus to control a media transfer protocol (MTP) device to effectively manage a media file transmitted from an MTP host.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method of controlling a media transfer protocol (MTP) device to manage a media file transmitted by an MTP host, the method including generating a second folder when the number of files in a first folder assigned as a parent object of the media file in a file system of the MTP device by the MTP host is equal to or more than a predetermined threshold value, storing the media file in the generated second folder, and registering the first folder as the parent object of the media file in a database of the MTP device.

The second folder may be a sub-folder of the first folder.

The first and second folders may have the same folder depth.

The method may further include setting the threshold value according to a user input.

The foregoing and/or other aspects and utilities of the present general inventive concept may also be achieved by providing a computer readable having recorded thereon a program to execute a method of generating a second folder when the number of files in a first folder assigned as a parent object of the media file in a file system of the MTP device by the MTP host is equal to or more than a predetermined threshold value, storing the media file in the generated second folder, and registering the first folder as the parent object of the media file in a database of the MTP device.

The foregoing and/or other aspects and utilities of the present general inventive concept may also be achieved by providing an apparatus to control an MTP device to manage a media file transmitted by an MTP host, the apparatus including a controller to generate a second folder when the number of files in a first folder assigned as a parent object of the media file in a file system of the MTP device by the MTP host is equal to or more than a predetermined threshold value, and to store the media file in the generated second folder, and a DB manager to register the first folder as the parent object of the media file in a database of the MTP device.

The foregoing and/or other aspects and utilities of the present general inventive concept may also be achieved by providing an apparatus to control a media transfer protocol (MTP) device to manage a media file transmitted by an MTP host, the apparatus including a storage unit and a controller to receive one or more first media files and one or more second media files, to store the first media files in a first folder, to generate a second folder when a characteristic of the first media files of the first folder is equal to or greater than a threshold value, and to store one or more second media files in the generated second folder.

The foregoing and/or other aspects and utilities of the present general inventive concept may also be achieved by providing a method of a media transfer protocol (MTP) device to manage a media file transmitted by an MTP host, the method including storing first media files in a first folder, generating a second folder when a characteristic of the first media files of the first folder is equal to or greater than a threshold value; and storing one or more second media files in the generated second folder.

The method may further include assigning the first folder as a parent object of the first and second media files in a database.

The first media files may have a first object handle as an object handle of a parent object, and the second media files may have a second object handle with respect to the parent object.

The method may further include communicating with an external device to transmit or receive the first media files and the second media files, and the external device may store or access the first media files and the second media files according to the first object handle and the second object handle.

The method may further include registering the first folder as the parent object of the first and second media folders in the data base.

The first folder may have a first priority and the second folder may have a second priority such that files are stored in the first folder as the first media files and such that additional files are stored in the second folder after the first folder is filled with the first media files.

The method may further include receiving the first media files to store in the first folder, and receiving the second media files to store in the second folder after the characteristic of the first media files of the first folder is equal to or greater than the threshold value.

The characteristic of the first media files may include one of a maximum number of the first media files to be stored in the first folder, and an amount of data of the first media files to be stored in the first folder.

The threshold value may correspond to at least one of the maximum number and the amount of data of the first media files to be stored in the first folder.

The foregoing and/or other aspects and utilities of the present general inventive concept may also be achieved by providing a method of a media transfer protocol (MTP) device to manage a media file transmitted by an MTP host, the method including receiving first media files to store in a first folder, generating a second folder when the number of files stored in a first folder assigned as a parent object of the media file in a file system of the MTP device by the MTP host is equal to or more than a predetermined threshold value, storing one or more second media files in the generated second folder, and registering the first folder as the parent object of the media file in a database of the MTP device.

The foregoing and/or other aspects and utilities of the present general inventive concept may also be achieved by providing an apparatus to control a media transfer protocol (MTP) device to manage a media file transmitted by an MTP host, the apparatus including a storage unit and a controller to receive one or more first media files and one or more second media files, to store the first media files in a first folder of the storage unit, to generate a second folder in a second folder when a characteristic of the first media files of the first folder is equal to or greater than a threshold value, to store the second media files in the generated second folder of the storage unit, and to register the first folder as the parent object of the media file in a database of the MTP device.

BRIEF DESCRIPTION OF THE DRAWINGS

The above and other features and advantages of the present general inventive concept will become more apparent by describing in detail exemplary embodiments thereof with reference to the attached drawings in which.

DETAILED DESCRIPTION OF THE PREFERRED EMBODIMENTS

Figure 1:
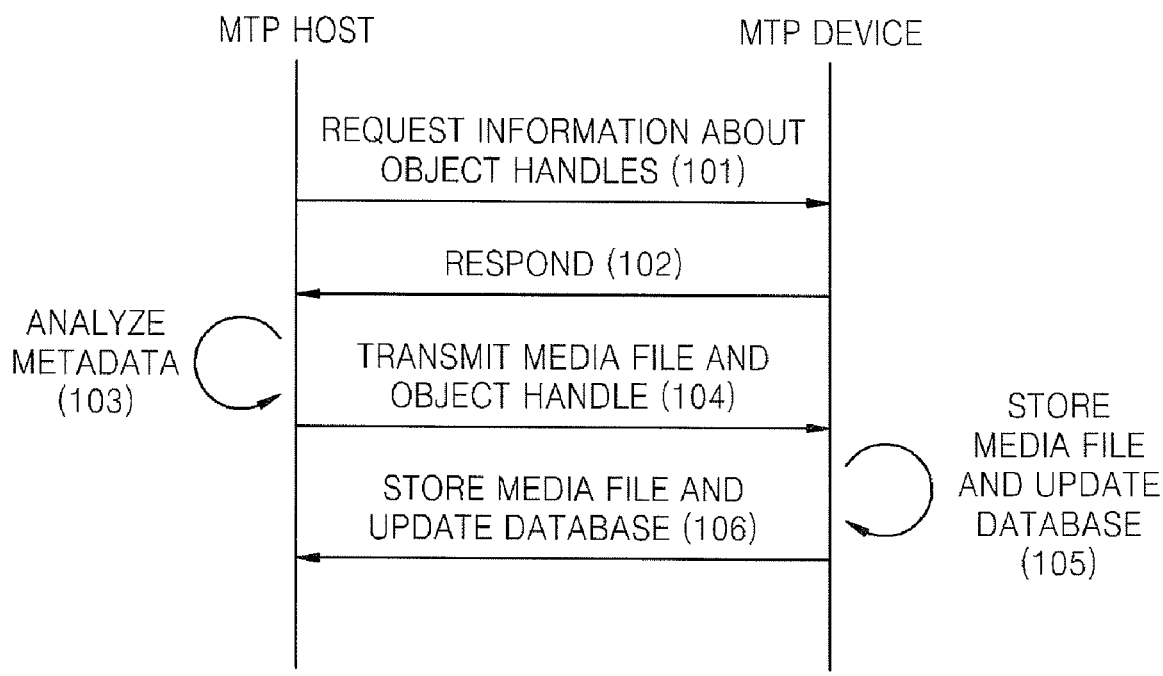
FIG. 1 is a flowchart illustrating conventional processes of transmitting a file between a media transfer protocol (MTP) device and an MTP host.
Figure 2:
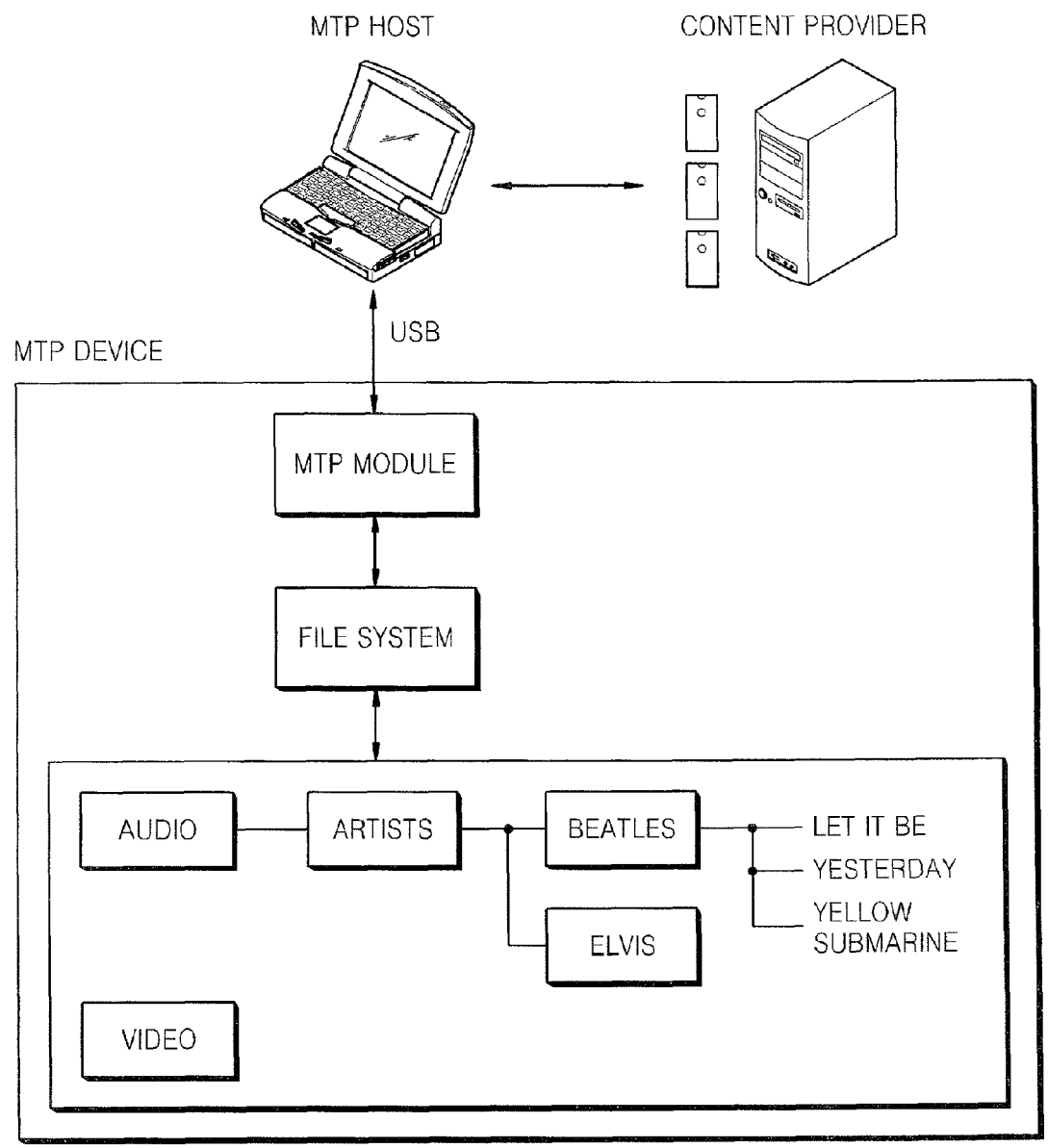
FIG. 2 is a diagram illustrating a conventional directory hierarchy built in a file system of an MTP device.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 3:
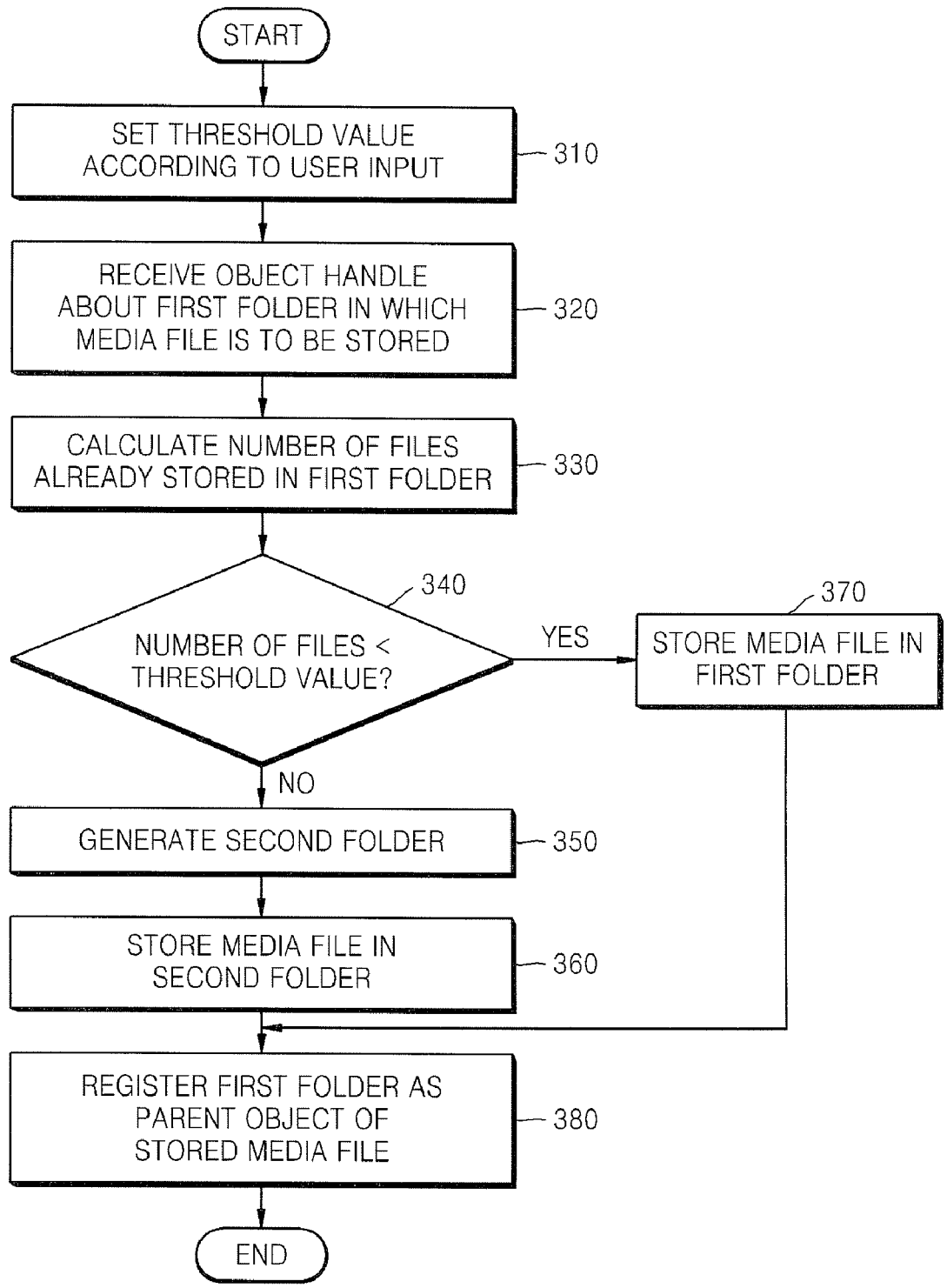
FIG. 3 is a flowchart illustrating a method of an MTP device to manage a media file according to an embodiment of the present general inventive concept.

FIG. 3 is a flowchart illustrating a method of controlling a media transfer protocol (MTP) device to manage a media file according to an embodiment of the present general inventive concept.

In operation 310, the MTP device sets a threshold value according to a user input. Here, the threshold value is a maximum number of files that can be stored in one folder in a file system of the MTP device.

In the current embodiment, the threshold value can be directly set by a user, but it can be fixed to a certain value determined during a manufacturing process of the MTP device so that the user cannot change the threshold value.

It is possible that the threshold value may be changed by a user if necessary after the manufacturing process of the MTP device.

The threshold value may be a capacity (amount of data) of the folder to store the files. Therefore, the maximum number of files or the amount of data of files can be compared to the threshold value. However, the present general inventive concept is not limited thereto. Other characteristics of the files or the folder can be used to be compared to a corresponding threshold value.

In operation 320, the MTP device receives an object handle of a first folder in which a media file received from the MTP host is to be stored. In other words, the first folder is a parent object of the media file.

In operation 330, the MTP device calculates the number of files already stored in the first folder.

In operation 340, the MTP device determines whether the calculated value, that is the number of files already stored in the first folder, is smaller than the threshold value. If the calculated value is smaller than the threshold value, operation 370 is performed, and if the calculated value is equal to or larger than the threshold value, operation 350 is performed.

In operation 370, if the number of files already stored in the first folder is smaller than the threshold value, the MTP device stores the media file in the first folder.

However, in operation 350, if the number of files already stored in the first folder is equal to or larger than the threshold value, the MTP device generates a second folder. Here, the second folder may be generated as a sub-folder of the first folder, or to have the same folder depth as the first folder. The first and second folders having the same folder depth mean that their parent folder is the same.

In operation 360, the MTP device stores the media file in the second folder.

In operation 380, the MPT device registers the first folder as a parent object of the stored media file in a database.

Although FIG. 3 illustrates the number of files, the amount of data of files can be used to be compared to a corresponding threshold. Therefore, the maximum number of files may be referred to as the amount of data of the files to be compared to the corresponding threshold.

As described above, the MTP host cannot directly access the file system of the MTP device, but accesses the media files stored in the MTP device via the object handle. Accordingly, even if the media file is stored in the second folder in the file system, an object handle of the first file is registered as an object handle about the parent object of the media file in the database of the MPT device. If an object handle about the second file is registered as an object handle about the parent object of the media file in the database of the MTP device, the MTP host may determine that a storing operation of the media file fails since the media file does not exist in the first folder but in the second folder, and may retry the same storing operation.

Figure 4A:
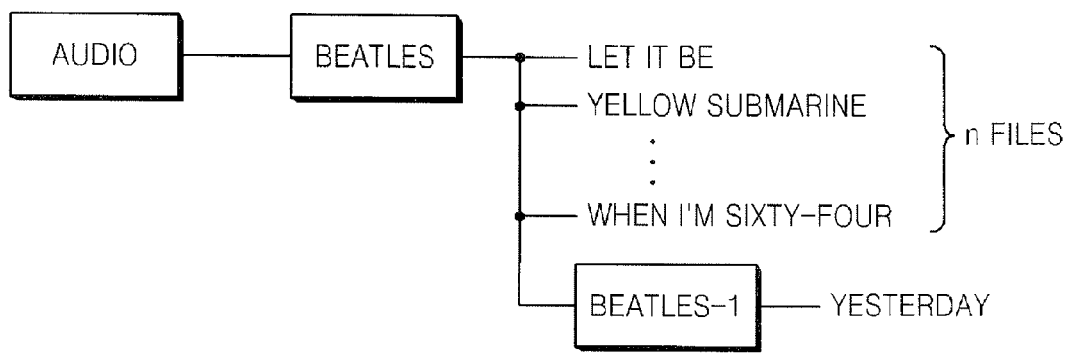
FIG. 4A is a diagram illustrating a directory hierarchy built in a file system of an MTP device according to an embodiment of the present general inventive concept.

FIG. 4A is a diagram illustrating a directory hierarchy built in a file system of an MTP device according to an embodiment of the present general inventive concept.

In the current embodiment, n files are already stored in a <BEATLES> folder of an audio folder of the MTP device, where n is a threshold value. It is assumed that an MTP host analyzes metadata of an audio file called "yesterday," and commands the MTP device to store the audio file in the <BEATLES> folder.

Here, as illustrated in FIG. 4A, the MTP device recognizes that there are already n files stored in the <BEATLES> folder, generates a <BEATLES-1> folder as a sub-folder of the <BEATLES> folder, and then stored the audio file in the <BEATLES-1>. As described above, an object handle of the <BEATLES> folder is registered in a database as an object handle of a parent object of the audio file, and the <BEATLES-1> folder is registered as a second folder.

Figure 4B:
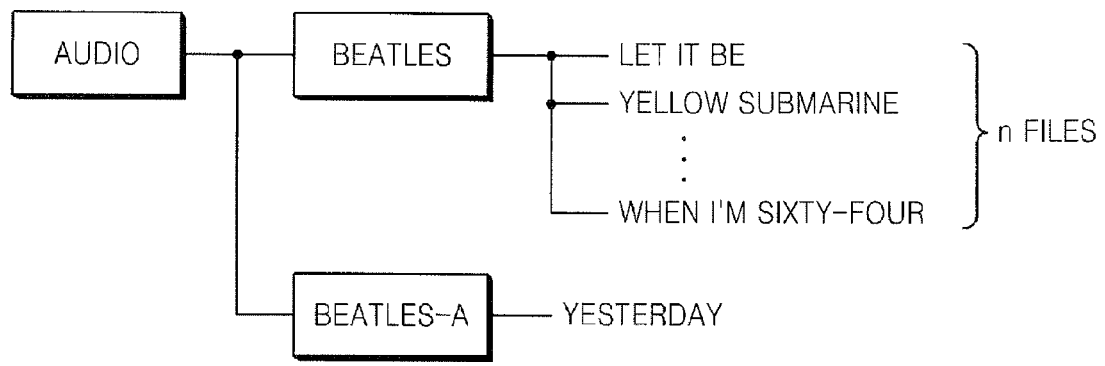
FIG. 4B is a diagram illustrating a directory hierarchy built in a file system of an MTP device according to another embodiment of the present general inventive concept.

FIG. 4B is a diagram illustrating a directory hierarchy built in a file system of an MTP device according to another embodiment of the present invention.

Similar to the previous embodiment, n files are already stored in a <BEATLES> folder of the MTP device in the current embodiment, where n is a threshold value. It is assumed that an MTP host analyzes metadata of an audio file called "yesterday", and commands the MTP device to store the audio file in the <BEATLES> folder.

However in the current embodiment of FIG. 4B, a <BEATLES-A> folder is generated to have the same depth as the <BEATLES> folder, unlike the previous embodiment of FIG. 4A where the <BEATLES-1> folder is generated as a sub-folder of the <BEATLES> folder.

In the current embodiment of FIG. 4B, an object handle of the <BEATLES> folder is registered in a database of the MTP device as an object handle of a parent object of the audio file.

Figure 5:
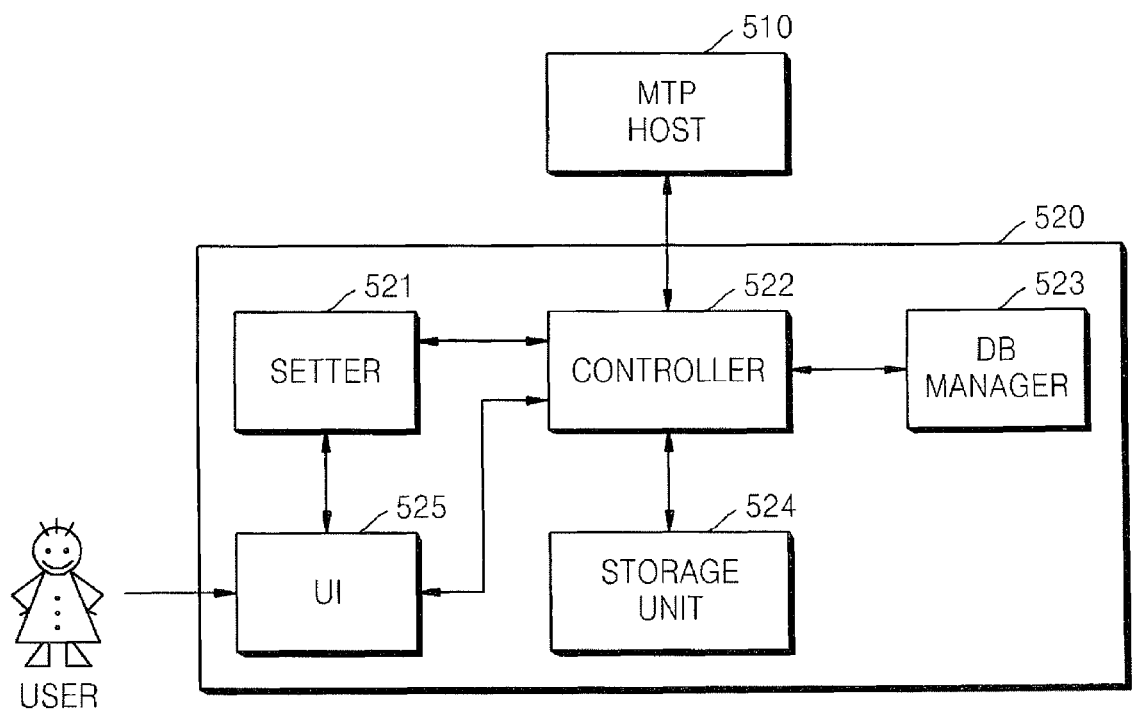
FIG. 5 is a block diagram illustrating an MTP device according to an embodiment of the present general inventive concept.

FIG. 5 is a block diagram illustrating an MTP device 520 according to an embodiment of the present general inventive concept.

Referring to FIG. 5, the MTP device 520 includes a setter 521, a controller 522, a DB manager 523, and a storage unit 524. Some elements of the MTP device 520 may be realized in hardware or software.

The setter 521 sets a threshold value according to a user input. As described above, the threshold value is the maximum number of files that can be stored in one folder in a file system of the MTP device 520.

The storage unit 524 is a memory to store media files.

The controller 522 stores a media file received from an MTP host 510 in the storage unit 524 through the file system. Here, the MTP host 510 transmits an object handle, which shows a location where the media file is to be stored, to the MTP device 520. Generally, such object handle shows a folder in which the media file is to be stored. When the number of files stored in a folder (a first folder) in the file system of the MTP device 520 assigned by the MTP host 510 is equal to or more than the threshold value, the controller 522 generates another folder (a second folder) and stores the media file in the second folder.

The DB manager 523 manages a database about media files stored in the storage unit 524. For example, even when the media file is stored in the second folder in the file system of the MTP device 520, the DB manager 523 updates the database in such a way that the parent object of the media file is the first folder. Accordingly, a user interface 525 of the MTP device 520 and the MTP host 510 recognizes that the media file is stored in the first folder.

According to the present invention, the number of files stored in one folder in a file system of an MTP device is limited, and thus delay in reading/writing files due to the large number of files can be reduced. As a result, file transmission speed via MTP can be improved.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While this present general inventive concept has been particularly shown and described with reference to preferred embodiments thereof, it will be understood by those skilled in the art that various changes in form and details may be made therein without departing from the spirit and scope of the general inventive concept as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of a media transfer protocol (MTP) device to manage a media file transmitted by an MTP host, the method comprising:
   generating a second folder when the number of files stored in a first folder assigned as a parent object of the media file in a file system of the MTP device by the MTP host is equal to or more than a predetermined threshold value;
   storing the media file in the generated second folder; and
   registering the first folder as the parent object of the media file in a database of the MTP device.

2. The method of claim 1, wherein the second folder is a sub-folder of the first folder.

3. The method of claim 1, wherein the first and second folders have the same folder depth.

4. The method of claim 1, further comprising:
   setting the threshold value according to a user input.

5. A non-transitory computer-readable medium to contain computer-readable codes as a program to execute a method of a media transfer protocol (MTP) device to manage a media file transmitted by an MTP host, the method comprising:
   generating a second folder when the number of files stored in a first folder assigned as a parent object of the media file in a file system of the MTP device by the MTP host is equal to or more than a predetermined threshold value;
   storing the media file in the generated second folder; and
   registering the first folder as the parent object of the media file in a database of the MTP device.

6. An apparatus to control an MTP device to manage a media file transmitted by an MTP host, the apparatus comprising:
   a controller to generate a second folder when the number of files in a first folder assigned as a parent object of the media file in a file system of the MTP device by the MTP host is equal to or more than a predetermined threshold value, and to store the media file in the generated second folder; and
   a DB manager to register the first folder as the parent object of the media file in a database of the MTP device.

7. The apparatus of claim 6, wherein the second folder is a sub-folder of the first folder.

8. The apparatus of claim 6, wherein the first and second folders have the same folder depth.

9. The apparatus of claim 6, further comprising a setter, which sets the threshold value according to a user input.

* * * * *